(12) United States Patent
Budge

(10) Patent No.: US 9,809,453 B2
(45) Date of Patent: Nov. 7, 2017

(54) CATALYSTS FOR HYDROCARBON REFORMING

(71) Applicant: LG Fuel Cell Systems, Inc., North Canton, OH (US)

(72) Inventor: John R. Budge, Beachwood, OH (US)

(73) Assignee: LG Fuel Cell Systems, Inc., North Canton, OH (US)

( * ) Notice: Subject to any disclaimer, the term of this patent is extended or adjusted under 35 U.S.C. 154(b) by 0 days.

(21) Appl. No.: 13/837,544

(22) Filed: Mar. 15, 2013

(65) Prior Publication Data

US 2014/0272642 A1 Sep. 18, 2014

(51) Int. Cl.
| | |
|---|---|
| B01J 23/96 | (2006.01) |
| C01B 3/40 | (2006.01) |
| C01B 3/38 | (2006.01) |
| H01M 8/0612 | (2016.01) |
| B01J 37/20 | (2006.01) |

(Continued)

(52) U.S. Cl.
CPC ............ *C01B 3/40* (2013.01); *B01J 23/40* (2013.01); *B01J 23/464* (2013.01); *B01J 23/74* (2013.01); *B01J 37/20* (2013.01); *C01B 3/38* (2013.01); *H01M 8/0618* (2013.01); *B01J 23/96* (2013.01); *C01B 2203/0233* (2013.01); *C01B 2203/0238* (2013.01); *C01B 2203/0244* (2013.01); *C01B 2203/066* (2013.01); *C01B 2203/1052* (2013.01); *C01B 2203/1235* (2013.01); *C01B 2203/1258* (2013.01); *H01M 2008/1293* (2013.01); *Y02P 20/142* (2015.11); *Y02P 20/52* (2015.11)

(58) Field of Classification Search
CPC .................................. B01J 23/96; B01J 37/20

USPC ............ 429/423; 502/34, 216, 223; 422/162
See application file for complete search history.

(56) References Cited

U.S. PATENT DOCUMENTS

| | | | |
|---|---|---|---|
| 3,898,153 A | 8/1975 | Louder et al. | |
| 3,948,762 A * | 4/1976 | Hayes | ............... 208/139 |

(Continued)

FOREIGN PATENT DOCUMENTS

| | | |
|---|---|---|
| CN | 101362587 A | 2/2009 |
| CN | 102974360 A | 3/2013 |

(Continued)

OTHER PUBLICATIONS

Demina et al., "Phase Equilibria and Crystal Structures of Mixed Oxides int he La—Mn—Ni—I System," Inorganic Materials, vol. 41, No. 7, Jan. 16, 2005, pp. 736-742.

(Continued)

*Primary Examiner* — Matthew E Hoban
*Assistant Examiner* — James Fiorito
(74) *Attorney, Agent, or Firm* — Shumaker & Sieffert, P.A.

(57) ABSTRACT

In some examples, a method for treating a reforming catalyst, the method comprising heating a catalyst metal used for reforming hydrocarbon in a reducing gas mixture environment. The reducing gas mixture comprises hydrogen and at least one sulfur-containing compound. The at least one sulfur-containing compound includes one or more of hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR').

10 Claims, 4 Drawing Sheets

(51) Int. Cl.
  *B01J 23/40* (2006.01)
  *B01J 23/46* (2006.01)
  *B01J 23/74* (2006.01)
  *H01M 8/124* (2016.01)

(56) References Cited

U.S. PATENT DOCUMENTS

| | | |
|---|---|---|
| 4,693,882 A | 9/1987 | Setzer et al. |
| 5,100,857 A | 3/1992 | Sato et al. |
| 5,106,484 A | 4/1992 | Nadler et al. |
| 5,916,700 A | 6/1999 | Ruka et al. |
| 6,821,498 B2 | 11/2004 | Vaughey et al. |
| 2004/0166394 A1 | 8/2004 | Sfeir et al. |
| 2005/0266297 A1 | 12/2005 | Irvine et al. |
| 2008/0011646 A1 | 1/2008 | Giroux et al. |
| 2012/0015259 A1 | 1/2012 | Budge |

FOREIGN PATENT DOCUMENTS

| | | |
|---|---|---|
| CN | 103282470 A | 9/2013 |
| JP | 2005340164 A | 12/2005 |
| JP | 2006269276 A | 10/2006 |

OTHER PUBLICATIONS

Farrauto et al., Precious Metal Catalysts Supported on Ceramic and Metal Monolithic Structures for the Hydrogen Economy, Catalysis Review, 49:2, Mar. 13, 2007, pp. 141-196.

Ishihara et al., "Oxide Anode Derived from Sr-Doped LaMnO3 Perovskite Oxide for SOFCs Using LaGaO3 Electrolyte," Journal of the Electrochemical Society 153(11): A2085-A2090, May 18, 2006.

Jin et al., "LA0.6Sr1.4MnO4 layered perovskite anode material for intermediate temperature solid oxide fuel cells," Electrochemistry Communications 14, Mar. 30, 2012, pp. 75-77.

International Search Report and Written Opinion of counterpart international application No. PCT/US2014/022027, mailed Jun. 6, 2014, 10 pp.

Luna et al., "Methane Steam Reforming Over Rhodium Promoted Ni/Al2O3 Catalysts," Reaction Kinetics & Catalysis Letters, vol. 67, No. 2, Elsevier Science B.V., Jul. 1999, 7 pp.

International Preliminary Report on Patentability from International Application No. PCT/US2014/022027, mailed Sep. 24, 2015, 7 pp.

Written Opinion to counterpart Singapore Application No. 11201507303Q, dated mailed Jun. 16, 2016, 6 pp.

First Examination Report from counterpart Australian Patent Application No. 2014237583, dated Jan. 25, 2017, 3 pp.

First Office Action and Search Report, and translation thereof, from counterpart Chinese Application No. 201480016085.0, dated Nov. 18, 2016, 16 pp.

Written Opinion from counterpart Singaporean Patent Application No. 11201507303Q, dated Jan. 20, 2017, 4 pp.

Xu, "Handbook of Natural Gas Utilization," Chinese Petrochemical Press, p. 452, Oct. 2006, 3 pp.

Response to Written Opinion dated Feb. 7, 2017, from counterpart Singaporean Application No. 11201507303Q, filed Jul. 6, 2017, 7 pp.

\* cited by examiner

CATALYSTS FOR HYDROCARBON REFORMING

TECHNICAL FIELD

The disclosure generally relates to hydrocarbon reforming, such as, e.g., for use with solid oxide fuel cell systems.

BACKGROUND

Fuel cells and fuel cell systems, such as, e.g., solid oxide fuel cell and solid oxide fuel cell systems remain an area of interest. Some existing systems have various shortcomings, drawbacks, and disadvantages relative to certain applications. Accordingly, there remains a need for further contributions in this area of technology.

SUMMARY

In some examples, the disclosure relates to catalyst metals for use in the reformation of hydrocarbons, such as, e.g., for use with steam reformers, to produce hydrogen. The catalyst may be treated with a reducing gas comprising hydrogen and a sulfur compound. The sulfur compound includes one or more of hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR'). By treating the catalyst with the proper dose of sulfur, the catalyst performance may be stabilized while not substantially negatively impacting catalyst activity. In some examples, the treatment of catalyst metals may be performed in situ during reformation via a reformer by periodically adding the sulfur-containing compound to the reformer feed stream. The hydrogen produced via the reformer employing the metal catalyst metal may be fed to the fuel side of a solid oxide fuel stack.

In one example, the disclosure is directed to a method for treating a reforming catalyst, the method comprising heating a catalyst metal used for reforming hydrocarbon in a reducing gas mixture environment, wherein the reducing gas mixture comprises hydrogen and at least one sulfur-containing compound, wherein the at least one sulfur-containing compound includes one or more of hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR').

In another example, the disclosure is directed to an article for reforming hydrocarbons, the article comprising a catalyst metal for reforming hydrocarbons, wherein the catalyst metal has been treated by heating in a reducing gas mixture environment, wherein the reducing gas mixture comprises hydrogen and at least one sulfur-containing compound, wherein the at least one sulfur-containing compound includes one or more of hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR').

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

DETAILED DESCRIPTION

Figure 1:
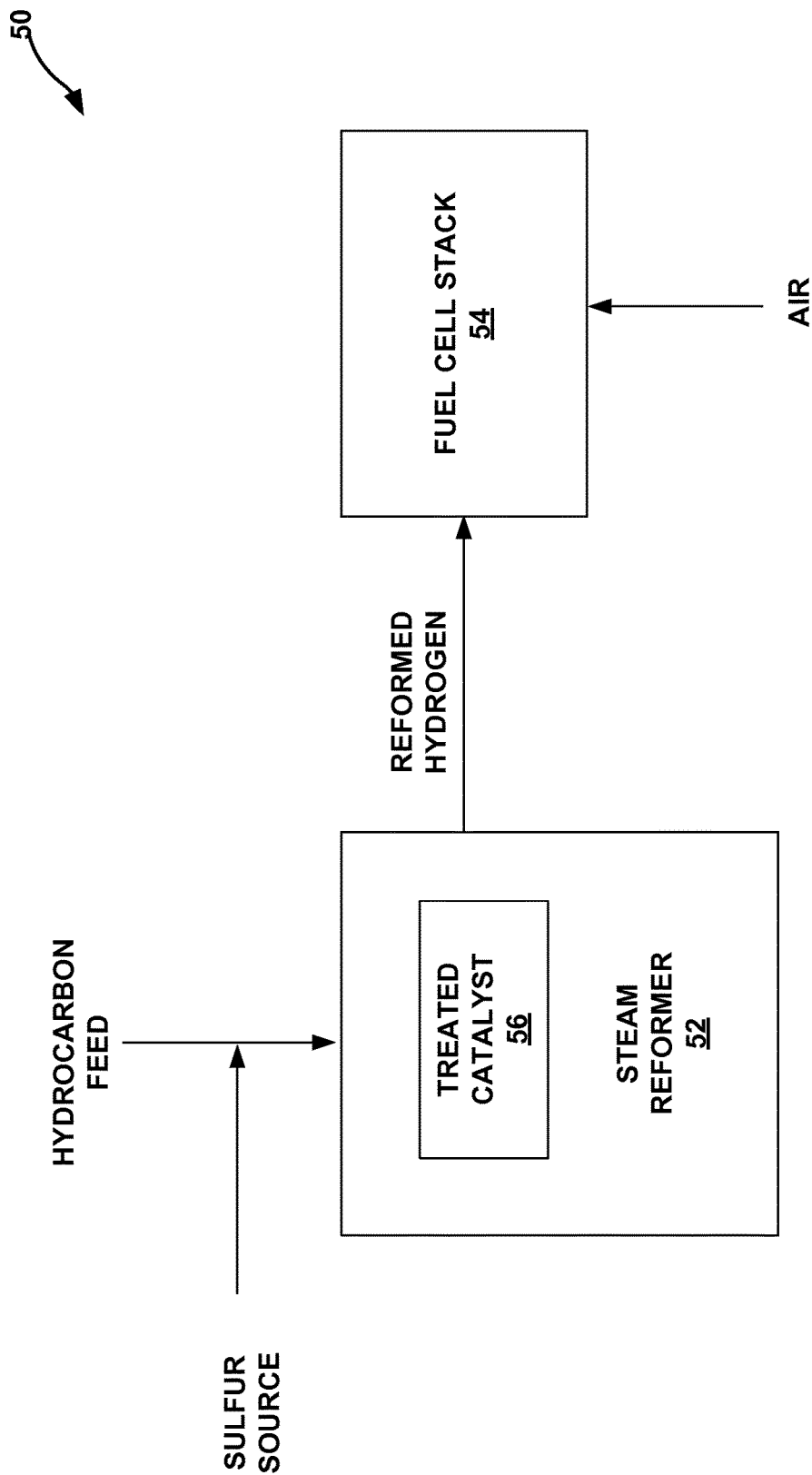
FIG. 1 is a schematic diagram illustrating an example fuel cell system.

FIG. 1 is a schematic diagram illustrating an example fuel cell system 50 in accordance with an embodiment of the present disclosure. Fuel cell system 50 includes fuel cell stack 54 and steam reformer 52. For ease of illustration, examples of the disclosure are primarily described with regard to steam reformers configured to produce hydrogen from the steam reformation of hydrocarbons using examples of treated catalyst metals. However, examples are not limited to steam reformation. Other examples may include use of example treated catalysts through the process of dry reforming of hydrocarbons, autothermal reforming of hydrocarbons, and/or catalytic partial oxidation of hydrocarbons.

Steam reformer 52 may receive a gaseous feed stream including one or more hydrocarbons. Example hydrocarbons fed to reformer 52 may preferably include lighter hydrocarbons such as methane, ethane, propane, butane and also $C_5$ and heavier hydrocarbons. The hydrocarbon feed reacts with steam at a high temperature in the presence of catalyst metal 56. The reaction in the steam reformer via reformer 52 produces, among others, hydrogen. The reformed hydrogen may be fed from the steam reformer to the fuel side of fuel cell stack 54, while air (or other oxidant) is fed to the oxidant side of fuel cell stack 54. Fuel cell stack 54 may produce electricity using the hydrogen fed to the fuel side of the fuel cell stack.

As noted above, catalyst metal 56 may be treated with a reducing gas comprising hydrogen and a sulfur compound. The sulfur compound includes one or more of hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR'). By treating the catalyst with the proper dose of sulfur, the catalyst performance may be stabilized while not substantially negatively impacting catalyst activity. In some examples, the treatment of catalyst metals may be performed in situ during reformation via a reformer by periodically adding the sulfur-containing compound to the reformer feed stream. The hydrogen produced via the reformer employing the metal catalyst metal may be fed to the fuel side of a solid oxide fuel stack. In this manner, resulting improvement in catalyst durability may result in operational savings, e.g., due to the longer maintenance interval for either changing out the catalyst or replacing a reformer unit.

Steam reforming catalyst metal 56 may comprise one or more catalytically active metals selected from the group Ni, Co, Rh, Ru, Pd, Pt and Co. Catalyst metal 56 may be supported on a suitable carrier. The amount of catalytically active metal 56 on the carrier may vary over a wide range, but in some examples are present in amounts ranging from about 0.1 to 40 wt %, such as, e.g., between about 0.5 and 10 wt %. Suitable carriers for the catalyst 56 include refractory oxides such as silica, alumina, titania, zirconia, tungsten oxides, and mixtures thereof. Mixed refractory oxides comprising at least two cations may also be employed as carrier materials for catalyst 56. Alumina oxides stabilized with oxides such as baria, ceria, lanthana and magnesia may be preferred carriers. The catalytically active metals may be deposited on the carrier by any suitable techniques including those known in the art. One suitable technique for depositing metals on the carrier is by impregnation, which may comprises contacting the carrier material with a solution of the catalytically active metal(s), followed by drying and calcining the resulting material.

Steam reforming is endothermic and heat transfer is an important consideration in the process design. In many steam reforming applications it is often advantageous to coat the steam reforming catalyst onto a metallic substrate in order to facilitate heat transfer from an external heat source to the process stream. A metal monolithic structure, for example, may be fabricated from a heat and oxidation resistant metal such as stainless steel or the like. FeCr alloy may be a preferred metal alloy for supporting catalysts and forming monoliths. Monolith supports may be made from such materials by placing a flat and a corrugated sheet one over the other and rolling the stacked sheets into a tubular configuration about an axis to the corrugations to provide a cylindrical structure having a plurality of fine parallel gas flow passages which may range typically from 200 to 1200 per square inch of end face area of the tubular roll.

Other suitable metallic substrate forms may include metallic foams and hot metal surfaces that are in direct contact with the process stream. An example of the latter would be the metallic heat-exchange surface of a heat exchanger. With a heat exchanger, a catalyst supported on corrugated metal foil, metal mesh, metal wire or porous metal foams may also be placed directly in the heat-exchanger channels. The catalytic materials can be coated onto the surface of the metallic substrate by techniques such as wash coating that are well known in the art. Further, the bonding between the catalyst wash-coat and the metal substrate may often be improved by pre-treating and activating the metal surface.

In accordance with one or more examples of the disclosure, while sulfur is considered in most instances to be a severe poison for steam reforming catalysts (e.g., Ni), it has been surprisingly found that the durability of steam reforming catalysts can be significantly improved by treating the catalyst with a reducing gas comprising hydrogen and one or more sulfur compounds selected from the group: hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR'). The sulfur dose (e.g., as defined by the product of the concentration of sulfur in the reducing treatment gas and the duration of the treatment) may vary over wide ranges, but the sulfur dose should preferably be sufficient to stabilize catalyst performance without greatly impacting catalyst activity. Catalyst performance, as reflected in the hydrocarbon conversion to reformed products, may degrade over time, e.g., due to several deactivations mechanism that reduce hydrocarbon conversion. The degradation mechanisms may include sintering of catalyst metal particles, loss of catalyst surface area and fouling. In some example, the techniques described herein significantly reduce the decline in hydrocarbon conversion over time without suppressing catalyst activity. This may be compared with processes described in the art which reduce catalyst deactivation but at the same time significantly reduce hydrocarbon conversion. Further, in some examples, a higher sulfur concentration in the reducing gas may reduce the treatment time. The sulfur dosage (ppb-hours), defined as the product of the sulfur level (in parts per billion) in the reducing gas and the exposure time (hours), can be used as a measure of the degree of sulfur treatment and resulting catalyst stabilization. Thus, comparable degrees of catalyst stabilization can be achieved by either: a) catalyst treatment with a higher feed sulfur level for a shorter time period, or b) catalyst treatment with a lower feed sulfur for a longer time period.

In accordance with examples of the disclosure, catalyst 56 may be treated with one or more sulfur compounds. While not wanting to be bound by theory, it is believed that the sulfur treatments result in metal sulfide formation close to the catalytically active metal centers which inhibits catalyst deactivation. The treatment of catalyst 56 as described herein may be carried out prior to operating the reforming process, or alternatively may be carried out in-situ (e.g., while the reforming process is in progress). In the case of in-situ treatment, the sulfur-containing compound(s) may be mixed in the hydrocarbon feed received by reformer 52. In this case, hydrogen addition to the feed is optional, as hydrogen is produced by the reforming reaction. In other examples, a reducing gas mixture including hydrogen and sulfur-containing compound(s) may be fed to reformer 52 via a separate feed line. The sulfur-containing compound(s) may be fed to reformer 52 for treatment of catalyst metal 56 on a substantially continuous or periodic basis. In the case of periodic treatment, catalyst metal 56 may be re-treated by feeding sulfur-containing compound(s) to reformer 52 if the rate of catalyst deactivation increases after extended periods of operation. When the reforming process is used with a fuel cell or other downstream process which has catalytic components, it is preferable to adjust the sulfur level in the reformer feed and the duration of treatment so as not to greatly impact the activity of either the reforming catalyst, fuel cell or other downstream processes.

In the case of pre-treatment, catalyst metal 56 may be treated by heating catalyst metal 52, prior to catalyst 52 being used for reforming hydrocarbon, in a reducing gas mixture environment, e.g., within a reactor. The reducing gas mixture may include hydrogen and at least one sulfur-containing compound, where the at least one sulfur-containing compound includes one or more of hydrogen sulfide, carbonyl sulfide, carbonyl disulfide and organic sulfur-containing compounds such as thiophenes, thiophanes, sulfides (RSH), disulfides ($RS_2R'$), tri-sulfides ($RS_3R'$) and mercaptans (RSR'). The pretreatment could be done in reformer 52 or in a separate vessel. Again, catalyst metal 56 may be re-treated by feeding sulfur-containing compound(s) to reformer 52 if the rate of catalyst deactivation increases after extended periods of operation.

As noted above, the dose of sulfur used for the treatment of metal catalyst 56 may be sufficient to stabilize catalyst performance without greatly impacting catalyst activity. The dose may be a function of concentration of sulfur in the reducing gas mixture as well as the duration of time that the reducing gas mixture is fed to the catalyst. For cases in which the reducing gas mixture is fed periodically to the catalyst, the frequency at which the mixture is fed may also determine the dosage. The effectiveness of the sulfur dosing may be dependent on the process conditions, metal and required treatment frequency. The sulfur dosage per treatment may range from about 100 to 50,000 ppb-h, and preferably from about 500 to 5000 ppb-h.

In some examples, since sulfur is a severe poison for steam reforming catalysts, the reducing gas mixture may preferably have a total sulfur concentration in the range of approximately 0.005 to approximately 10 parts per million volume (ppm-v), such as, e.g., approximately 0.02 to approximately 0.5 ppm-v. In some examples, catalyst pretreatment may preferably be carried out at temperatures of approximately 300 to approximately 1200 degrees Celsius, pressures of approximately 1 to approximately 200 bar, and gas hourly space velocities (GHSVs) of approximately 50 to approximately 100,000 hour$^{-1}$. For example, the catalyst treatment may be carried out at approximately 600 to approximately 1,000 degrees Celsius, pressure of approximately 1 to approximately 10 bar, and GHSVs of approximately 100 to approximately 50,000 hr$^{-1}$. Values other than those above are contemplated.

The steam reforming of hydrocarbons may be carried out via reformer 52 with catalyst metals 56 treated according to the techniques disclosed herein, e.g., at pressures of approximately 1 to approximately 50 bar, temperatures of approximately 500 to approximately 1200 degrees Celsius, GHSVs of approximately 100 to approximately 100,000 hr$^{-1}$, and steam to carbon ratios of approximately 0.5 to approximately 10. Values other than those above are contemplated. As noted above, in addition to steam reforming, other examples, such as, autothermal reforming, dry reforming and catalytic partial oxidation processes may also be carried out using catalysts treated according to the methods described herein.

In some examples, catalyst metals, such as, e.g., Ni, may be more susceptible to coke formation. In some examples, sulfur may be added to the stream reforming process to reduce catalyst metal coking. However, the relatively high levels of sulfur that may help reduce coking can also results in a significant reduction of catalyst activity. In accordance with one or more examples of the disclosure, the relatively low amount of sulfur provided to treat catalyst metal 56 may not result in a significant reduction of catalyst activity. The sulfur pretreatment dosage may be adjusted to give a reduction in hydrocarbon conversion that is less than 1%, and preferably less than 0.5%.

Figure 2:
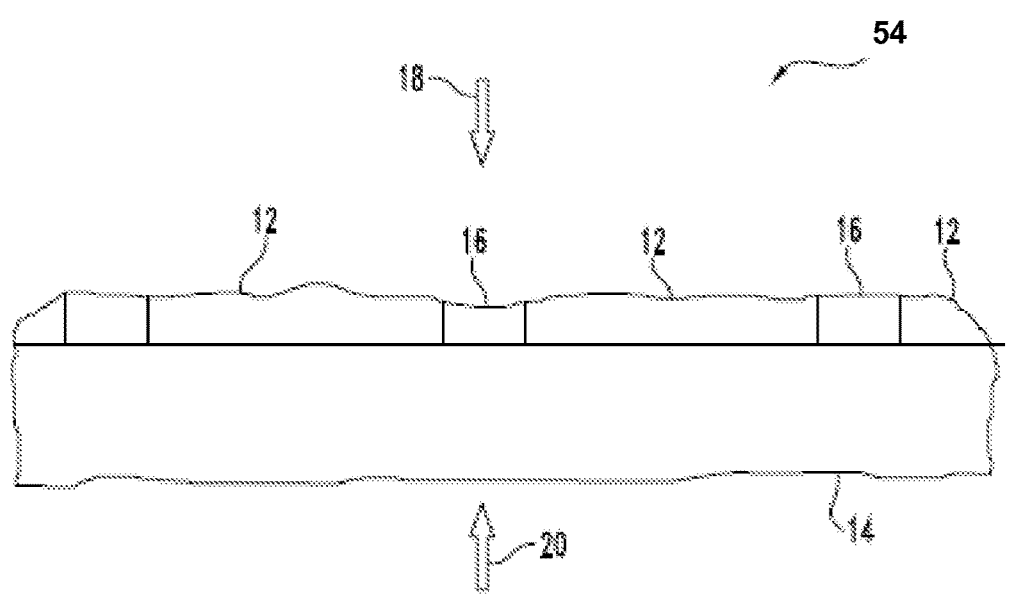
FIG. 2 is a schematic diagram illustrating an example fuel cell stack.

FIG. 2 is a schematic diagram illustrating fuel cell stack 54 includes a plurality of electrochemical cells 12 (or "individual fuel cells") formed on substrate 14. As described above, hydrogen produce by reformer 52 may be fed to the fuel side of fuel cell stack 54. Fuel cell stack 54 may then produce electricity using the reformed hydrogen. However, the techniques for generating reformed hydrogen using the treated catalyst metals described herein are not limited to use with fuel cells. Rather, the reformed hydrogen produced via the techniques described herein may be used for any suitable purpose.

Electrochemical cells 12 are coupled together in series by interconnects 16. Fuel cell system 10 is a segmented-in-series arrangement deposited on a flat porous ceramic tube, although it will be understood that the present disclosure is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 includes an oxidant side 18 and a fuel side 20. The oxidant is generally air, but could also be pure oxygen ($O_2$) or other oxidants, e.g., including dilute air for fuel cell systems having air recycle loops, and is supplied to electrochemical cells 12 from oxidant side 18. Substrate 14 may be porous, e.g., a porous ceramic material which is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14.

Figure 3:
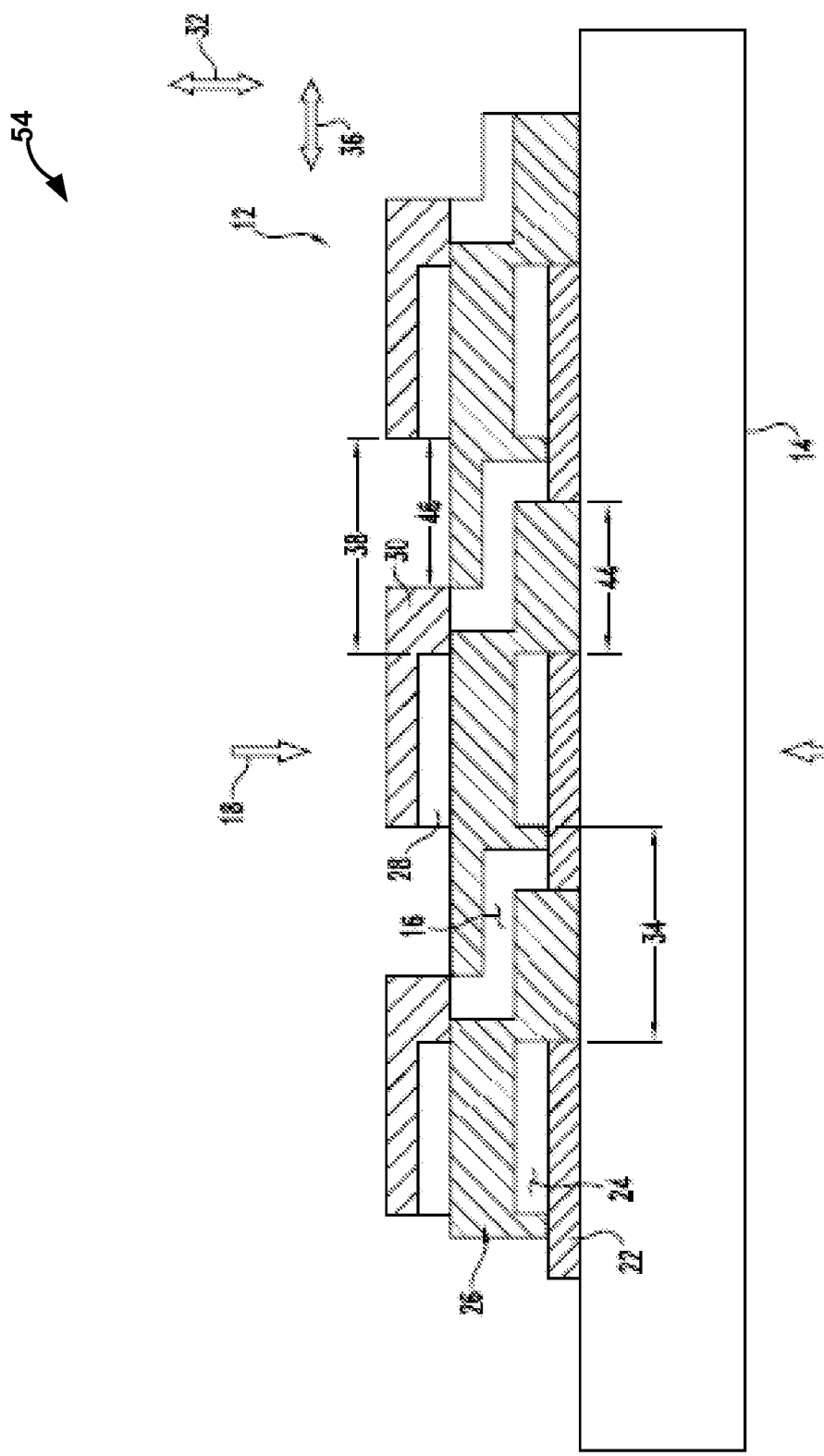
FIG. 3 is a schematic diagram illustrating an example cross section of a fuel cell stack.

FIG. 3 is a schematic diagram illustrating an example cross section of fuel cell stack 54. Fuel cell stack 54 may be formed of a plurality of layers screen printed onto substrate 14. Fuel cell stack 54 layers include an anode conductive layer 22, an anode layer 24, an electrolyte layer 26, a cathode layer 28 and a cathode conductive layer 30. In one form, electrolyte layer 26 may be a single layer or may be formed of any number of sub-layers.

Interconnects 16 for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

In each electrochemical cell 12, anode conductive layer 22 conducts free electrons away from anode 24 and conducts the electrons to cathode conductive layer 30 via interconnect 16. Cathode conductive layer 30 conducts the electrons to cathode 28.

Interconnect 16 is embedded in electrolyte layer 26, and is electrically coupled to anode conductive layer 22, and extends in direction 32 from anode conductive layer 22 through electrolyte layer 26, then in direction 36 from one electrochemical cell 12 to the next adjacent electrochemical cell 12, and then in direction 32 again toward cathode conductive layer 30, to which interconnect 16 is electrically coupled. In particular, at least a portion of interconnect 16 is embedded within an extended portion of electrolyte layer 26, wherein the extended portion of electrolyte layer 26 is a portion of electrolyte layer 26 that extends beyond anode 24 and cathode 28, e.g., in direction 32, and is not sandwiched between anode 24 and cathode 28. Although not shown in FIG. 3, in some examples, fuel cell system 10 may include one or more chemical barrier layers between interconnect 16 and adjacent components to reduce or prevent diffusion between the interconnect and adjacent components, e.g., an anode and/or an anode conductor film and/or cathode and/or cathode conductor film, may adversely affect the performance of certain fuel cell systems.

EXAMPLES

A series of experiments were performed to evaluate one or more aspects related to examples of the present disclosure.

Comparative Example

No Catalyst Pretreatment with Sulfur

A BASF supplied RM75 (Pt/Rh) catalyst coated on Alumchrome Y that was not treated with sulfur according to the examples described herein. The catalyst was aged for 2000 hours under the following steam reforming conditions: 800C, 4 Bara and feed gas composition of 14.2% $CH_4$, 9.3%

CO, 18.1% CO$_2$, 14.2% H$_2$, 39.6% H$_2$O and 4.6% N$_2$. The catalyst had a first-order deactivation rate of $1.47 \times 10^{-4}$ h$^{-1}$.

Example 1

Catalyst Treated with Sulfur

A BASF supplied RM75 (Pt/Rh) catalyst coated on Alumchrome Y was aged under the following steam reforming conditions: 800C, 4 Bara and feed gas composition of 14.2% CH4, 9.3% CO, 18.1% CO2, 14.2% H2, 39.6% H2O, 4.6% N2. Periodically, the feed stream was spiked with sulfur. Table 1 summarizes the sulfur level and duration of the sulfur spiking. The sulfur dose is defined as the product of the feed sulfur level (ppb) and exposure time (h). The periodic introduction of sulfur into the feed is detailed the following table.

| Treatment No. | TOS (h) | Sulfur Dopant | [S] (ppbv) | Temp. (C). | Sulfur Dose (ppb-h) |
| --- | --- | --- | --- | --- | --- |
| A | 30 | H$_2$S/CH$_4$ | 80 | 750 | 5120 |
| B | 885 | H$_2$S/CH$_4$ | 80 | 800 | 1840 |
| C | 986 | H$_2$S/CH$_4$ | 80 | 750 | 5120 |
| D | 1800 | PNG | 200 | 800 | 4800 |
| E | 2524 | PNG | 30 | 800 | 1980 |
| F | 3025 | PNG | 30 | 800 | 690 |
| G | 3167 | PNG | 30 | 800 | 630 |
| H | 3335 | PNG | 30 | 800 | 660 |
| I | 3505 | PNG | 30 | 800 | 660 |
| J | 3839 | PNG | 30 | 800 | 534 |
| K | 4012 | PNG | 40 | 800 | 534 |

Figure 4:
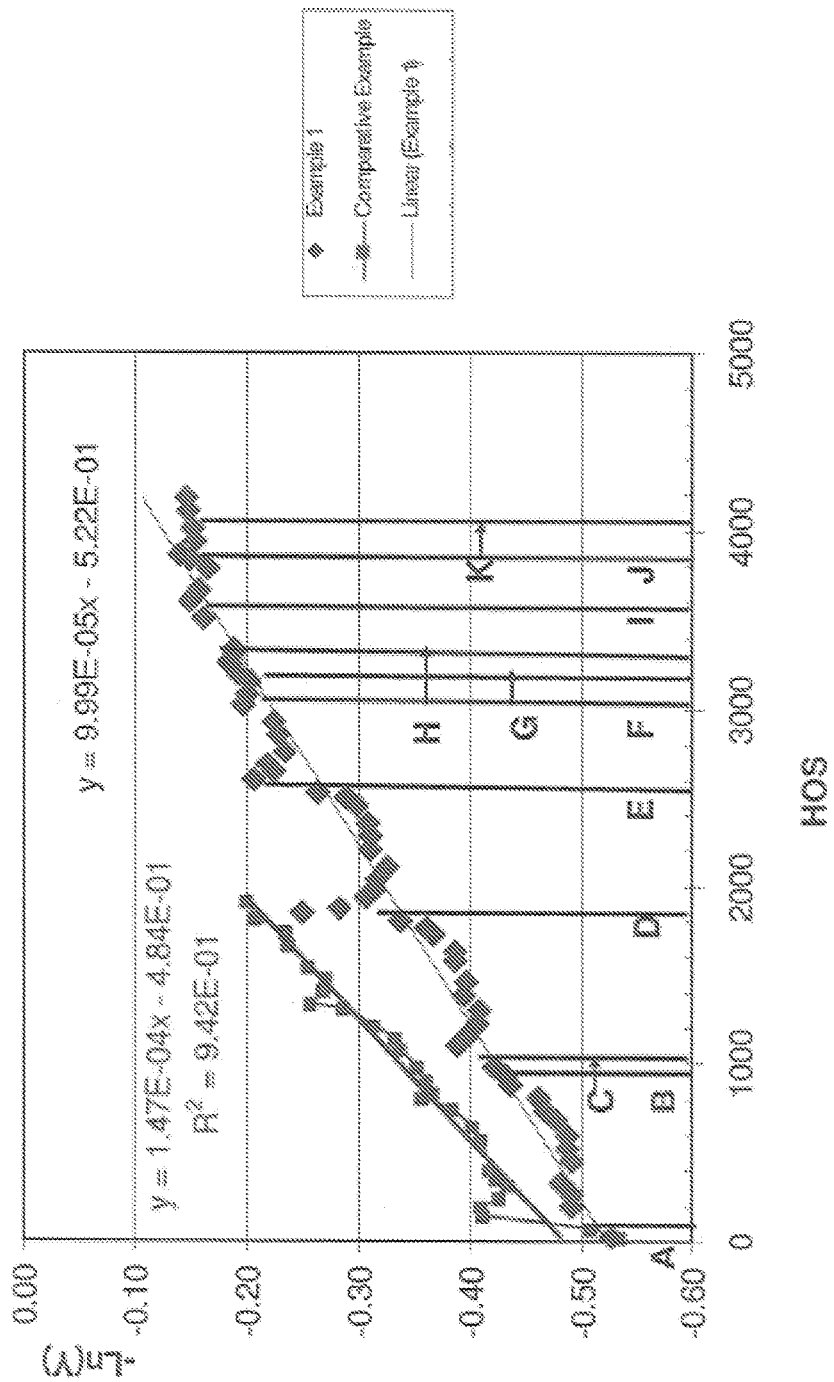
FIG. 4 is a plot of an activity function Y versus time-on-stream (TOS).

The sulfur was introduced in the feed stream either as H$_2$S or the naturally occurring sulfur compounds present in the available pipeline natural gas (PNG). It was found that introducing sulfur in the feed stream reduced the catalyst deactivation rate by at least 30%. FIG. 4 is a plot of an activity function Y versus time-on-stream (TOS) comparing Example 1 and the Comparative Example. It is expected that further adjustment of the frequency and level of sulfur dosing will further reduce the observed rate of catalyst deactivation.

The surfaces of both the treated and untreated catalyst were analyzed and the catalysts showed no evidence of carbon build up on the catalysts. Thus, coking does not appear to be significantly contributing to catalyst deactivation. While not wanting to be bound by theory, it is believed that maintaining a relatively low level of catalyst sulfidation inhibits the sintering of the highly dispersed metal crystallites that catalyze the steam reforming reactions.

Various embodiments of the invention have been described. These and other embodiments are within the scope of the following claims.

The invention claimed is:

1. A method comprising:
    reforming a gas stream in a reactor, the gas stream including hydrocarbons, using a treated catalyst metal to convert at least a portion of the hydrocarbons to hydrogen in the gas stream;
    periodically treating, while reforming the gas stream, the catalyst metal in a reducing gas mixture environment within the reactor, wherein the reducing gas mixture comprises hydrogen and at least one sulfur-containing compound, wherein the at least one sulfur-containing compound includes one or more of a hydrogen sulfide, a carbonyl sulfide, a carbonyl disulfide or an organic sulfur-containing compound, wherein periodically treating the catalyst metal while reforming the gas stream includes treating the catalyst metal with a total sulfur dose per treatment by periodically adding the sulfur-containing compound to the reactor with the gas stream, wherein the total sulfur dose per treatment is determined by a sulfur level in the reducing gas mixture and exposure time of the catalyst metal to the reducing gas mixture during the treatment, wherein the total sulfur dose per treatment is such that there is a decrease in a rate of deactivation of the catalyst metal during the reforming of the gas stream compared to the rate of deactivation of the catalyst metal not treated with the total sulfur dose; and
    supplying the reformed gas stream to the fuel side of a solid oxide fuel cell stack to generate electricity via an electrochemical reaction using the reformed gas stream as a fuel source, wherein a concentration of sulfur in the reducing gas mixture during each treatment is between approximately 5 parts per billion volume (ppb-v) and approximately 200 ppb-v.

2. The method of claim 1, wherein treating the catalyst metal comprises heating the catalyst metal, within the reactor, to a temperature between approximately 350 to 1,200 degrees Celsius in the reducing gas mixture environment.

3. The method of claim 1, wherein reforming the gas stream including the hydrocarbons using the treated catalyst metal comprises steam reforming the gas stream including the hydrocarbons using the treated catalyst metal.

4. The method of claim 1, wherein the catalyst metal comprises one or more of Ni, Co, Rh, Ru, Pd, Pt or Co.

5. The method of claim 1, further comprising:
    detecting, between periodic treatments of the catalyst metal, an increase in a rate of deactivation of the treated metal catalyst while reforming the gas stream using the treated catalyst metal; and
    re-treating the catalyst metal with the total sulfur dose in the reducing gas mixture environment based on the detection.

6. The method of claim 1, wherein the total sulfur dose is such that the rate of conversion of the hydrocarbons to hydrogen is decreased less than approximately 1 percent during the reforming of the gas stream compared to the rate of deactivation of the catalyst metal when not treated with the total sulfur dose.

7. The method of claim 1, wherein the decrease in the rate of deactivation of the catalyst metal is at least 30 percent compared to the rate of deactivation of the catalyst metal not treated with the total sulfur dose.

8. The method of claim 1, wherein the total sulfur dose per treatment is from about 100 parts per billion hour (ppb-h) to about 5000 ppb-h.

9. The method of claim 1, wherein sulfur concentration within the reactor during a periodic treatment is from approximately 0.02 part per million volume (ppm-v) to approximately 0.5 ppm-v.

10. The method of claim 1, wherein the gas stream comprises a natural gas stream, wherein the natural gas stream fed to the reactor during each periodic treatment includes the at least one sulfur-containing compound for treating the catalyst metal with the total sulfur dose.

* * * * *